United States Patent
Abdollahian Noghabi et al.

(10) Patent No.: US 12,136,001 B2
(45) Date of Patent: Nov. 5, 2024

(54) DISTRIBUTED COMPUTING WITH VARIABLE ENERGY SOURCE AVAILABILITY

(71) Applicant: Microsoft Technology Licensing, LLC, Redmond, WA (US)

(72) Inventors: Shadi Abdollahian Noghabi, Kirkland, WA (US); Ranveer Chandra, Kirkland, WA (US); Anirudh Badam, Issaquah, WA (US); Riyaz Mohamed Pishori, Sammamish, WA (US); Shivkumar Kalyanaraman, Bangalore (IN); Srinivasan Iyengar, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 17/446,821

(22) Filed: Sep. 2, 2021

(65) Prior Publication Data

US 2023/0061136 A1    Mar. 2, 2023

(51) Int. Cl.
*G06F 9/50* (2006.01)
*G06F 9/455* (2018.01)
*G06F 9/48* (2006.01)

(52) U.S. Cl.
CPC ........ *G06F 9/5094* (2013.01); *G06F 9/45558* (2013.01); *G06F 9/4881* (2013.01); *G06F 9/5083* (2013.01); *G06F 2009/4557* (2013.01); *G06F 2209/503* (2013.01); *G06F 2209/505* (2013.01)

(58) Field of Classification Search
None
See application file for complete search history.

(56) References Cited

U.S. PATENT DOCUMENTS 9,207,993 B2    12/2015    Jain

OTHER PUBLICATIONS

"2020 Annual Meeting of Stockholders and Battery Day", Retrieved from: www.tesla.com/2020shareholdermeeting?redirect=no, Sep. 22, 2020, 3 Pages.

(Continued)

*Primary Examiner* — Eric C Wai
(74) *Attorney, Agent, or Firm* — Alleman Hall & Tuttle LLP

(57) ABSTRACT

A computer system that includes a plurality of compute clusters that are located at different geographical locations. Each compute cluster is powered by a local energy source at a geographical location of that compute cluster. Each local energy source has a pattern of energy supply that is variable over time based on an environmental factor. The computer system further includes a server system that executes a global scheduler that distributes virtual machines that perform compute tasks for server-executed software programs to the plurality of compute clusters of the distributed compute platform. To distribute virtual machines for a target server-executed software program, the global scheduler is configured to select a subset of compute clusters that have different complementary patterns of energy supply such that the subset of compute clusters aggregately provide a target compute resource availability for virtual machines for the target server-executed software program.

20 Claims, 9 Drawing Sheets

(56) References Cited

OTHER PUBLICATIONS

"Amazon EC2 Spot Instances", Retrieved from: aws.amazon.com/ec2/spot/?cards.sort-by=item.additionalFields.startDateTime&cards.sort-order=asc, Retrieved Date: Jun. 4, 2021, 16 Pages.

Morris, Jesse.,"FERC Order 2222: a once-in-a-lifetime opportunity for decentralized technologies to accelerate the U.S. energy transition", Retrieved from: https://medium.com/energy-web-insights/ferc-order-2222-a-once-in-a-lifetime-opportunity-for-decentralized-technologies-to-accelerate-the-c35cf41527cb, Sep. 22, 2020, 8 Pages.

"Grid computing", Retrieved from:https://en.wikipedia.org/wiki/Grid_computing, Jun. 20, 2021, 14 Pages.

Slyvia, Tim., "PG&E, Tesla start building world's biggest battery", Retrieved from: www.pv-magazine.com/2020/07/30/pge-tesla-start-building-worlds-biggest-battery/, Jul. 30, 2020, 16 Pages.

"Tesla mega-battery in Australia activated PublishedDec. 1, 2017 Share Tesla battery in South Australia Image Copyrightreuters image captionThe battery has been installed in Jamestown, South Australia The world's largest lithium ion battery has begun dis", Retrieved from: www.bbc.com/news/world-australia-42190358, Dec. 1, 2017, 16 Pages.

"Tesla's Battery Supply Problem", Retrieved from: www.youtube.com/watch?v=1Xwxe0wU4b8, Oct. 24, 2020, 4 Pages.

Alvarez, Simon, "Tesla batteries deal another blow to Australia gas plants with record 150MW output", Retrieved from: www.teslarati.com/tesla-battery-world-record-output-150-mw-australia/, Jul. 21, 2020, 16 Pages.

Bullard, Nathaniel, "Google Enters Upside Down World of Renewable Supply and Demand", www.bloomberg.com/news/articles/2020-04-30/google-enters-upside-down-world-of-renewable-supply-and-demand?sref=JMv1OWqN, Apr. 30, 2020, 3 Pages.

Gupta, Anand, "ClearPath's Faith Martinez talks deep decarbonization, energy storage", Retrieved from: www.eqmagpro.com/clearpaths-faith-martinez-talks-deep-decarbonization-energy-storage/, Apr. 20, 2019, 21 Pages.

John, Jeff St., "Energy Vault Lands $110M From SoftBank's Vision Fund for Gravity Storage", Retrieved from: www.greentechmedia.com/articles/read/energy-vault-lands-110m-from-softbanks-vision-fund-for-gravity-energy-stora, Aug. 15, 2019, 5 Pages.

Kalyanaraman, Shivkumar, "Solar LCOE beats Coal in India . . . Far Sooner Than Expected: What Next?", Retrieved from: www.linkedin.com/pulse/solar-lcoe-beats-coal-india-far-sooner-than-expected-kalyanaraman/, May 24, 2017, 8 Pages.

Keane, Tom, "Azure Space—cloud-powered innovation on and off the planet", Retrieved from: blogs.microsoft.com/blog/2020/10/20/azure-space-cloud-powered-innovation-on-and-off-the-planet/, Oct. 20, 2020, 8 Pages.

Korosec, Kirsten, "Elon Musk predicts Tesla energy could be 'bigger' than its EV business", Retrieved from: techcrunch.com/2019/10/23/elon-musk-predicts-tesla-energy-could-be-bigger-than-its-ev-business/?guccounter=1, Oct. 24, 2019, 14 Pages.

Lambert, Fred, "Tesla is officially approved as electric utility in the UK—but why?", Retrieved from: electrek.co/2020/06/15/tesla-officially-approved-electric-utility-uk-why/, Jun. 15, 2020, 8 Pages.

Smolaks, et al., "Power density—the real benchmark of a data centre", Retrieved from: virtusdatacentres.com/item/389-power-density-the-real-benchmark-of-a-data-centre, Sep. 13, 2019, 3 Pages.

Ali, et al., "FollowMe@LS: Electricity Price and Source Aware Resource Management in Geographically Distributed Heterogeneous Datacenters", In Journal of Systems and Software, vol. 175, May 1, 2021, 21 Pages.

Khan, et al., "Energy, Performance and Cost Efficient Datacenters: A Survey", In Journal of Computer Science Review, vol. 40, May 1, 2021, 31 Pages.

"International Search Report and Written Opinion Issued in PCT Application No. PCT/US22/038606", Mailed Date: Oct. 21, 2022, 17 Pages.

DISTRIBUTED COMPUTING WITH VARIABLE ENERGY SOURCE AVAILABILITY

BACKGROUND

The cloud computing service industry is rapidly growing and has become a substantial source of carbon emissions. Cloud computing service providers and many clients of cloud computing services have pledged to become carbon neutral or negative in the near-term future. In order to reduce the carbon footprint of computing, many cloud computing service providers have moved toward using renewable energy to power their data centers. However, renewable energy powered cloud computing faces challenges due to the high variability of power produced by renewable energy sources compared to non-renewable energy sources that may degrade the performance of cloud computing services.

SUMMARY

A computer system is provided. The computer system may include a distributed compute platform comprising a plurality of compute clusters that are located at different geographical locations. Each compute cluster may be powered by a local energy source at a geographical location of that compute cluster. Each local energy source may have a pattern of energy supply that is variable over time based on an environmental factor. The computer system may further include a server system comprising at least one processor configured to execute a global scheduler that distributes virtual machines that perform compute tasks for server-executed software programs to the plurality of compute clusters of the distributed compute platform. To distribute virtual machines for a target server-executed software program, the global scheduler may be configured to select a subset of compute clusters from the plurality of compute clusters for the target server-executed software program. Respective compute clusters of the subset of compute clusters may be powered by local energy sources that have different complementary patterns of energy supply such that the subset of compute clusters aggregately provide a target compute resource availability for virtual machines for the target server-executed software program. The global scheduler may be further configured to distribute virtual machines for the target server-executed software program to one or more compute clusters of the selected subset of compute clusters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 at (B) shows an illustrative example of wind energy production for the same duration as the solar energy production at (A) for local energy sources of the computer system of FIG. 1.

DETAILED DESCRIPTION

Cloud computing systems require large amounts of stable power supply to provide continuously available computing resources to customers. Powering cloud services using renewable energy sources is challenging due to the high variability of power produced by renewable energy that is dependent upon varying environment factors such as local weather conditions. For example, solar energy sources do not produce power at night. Further, solar energy sources may also have varying daytime power output due to the presence of clouds and seasonal factors. Similarly, the power generation of wind-based energy sources may change frequently throughout the day and across seasons based on the direction and speed of the wind relative to the wind turbines. Typically, customers of cloud computing services demand 24/7 availability of the cloud computing resources, and do not accept frequent, unexpected, or lengthy downtime for said services. A search engine only available during the day, for example, would face many barriers to adoption. At the same time, many customers of cloud computing services often express a preference for the use of renewable energy to combat climate change.

Conventional systems typically either move energy across space via electric transmission lines or across time using batteries to mitigate these availability issues with renewable energy sources. For example, a data center could operate using energy from batteries or from traditional power generation sources during shortfalls in renewable energy production. However, these conventional solutions have several significant drawbacks. Firstly, traditional non-renewable energy sources typically have high carbon footprints. Secondly, electric transmission lines incur significant overheads. For example, typical electric transmission lines may incur a fifty-percent cost overhead from transmission and distribution. Further, adding new electric transmission lines is labor intensive, and may take a significant amount of time to be installed. Thirdly, market penetration of electric grid-scale Li-ion and other chemical batteries are minuscule in scale. For example, in the United States, grid-scale batteries currently have storage for around 0.4% of the overall solar and wind capacity in the electric grid. Therefore, significant technical challenges remain for adoption of renewable energy sources as power sources for cloud computing systems.

Figure 1:
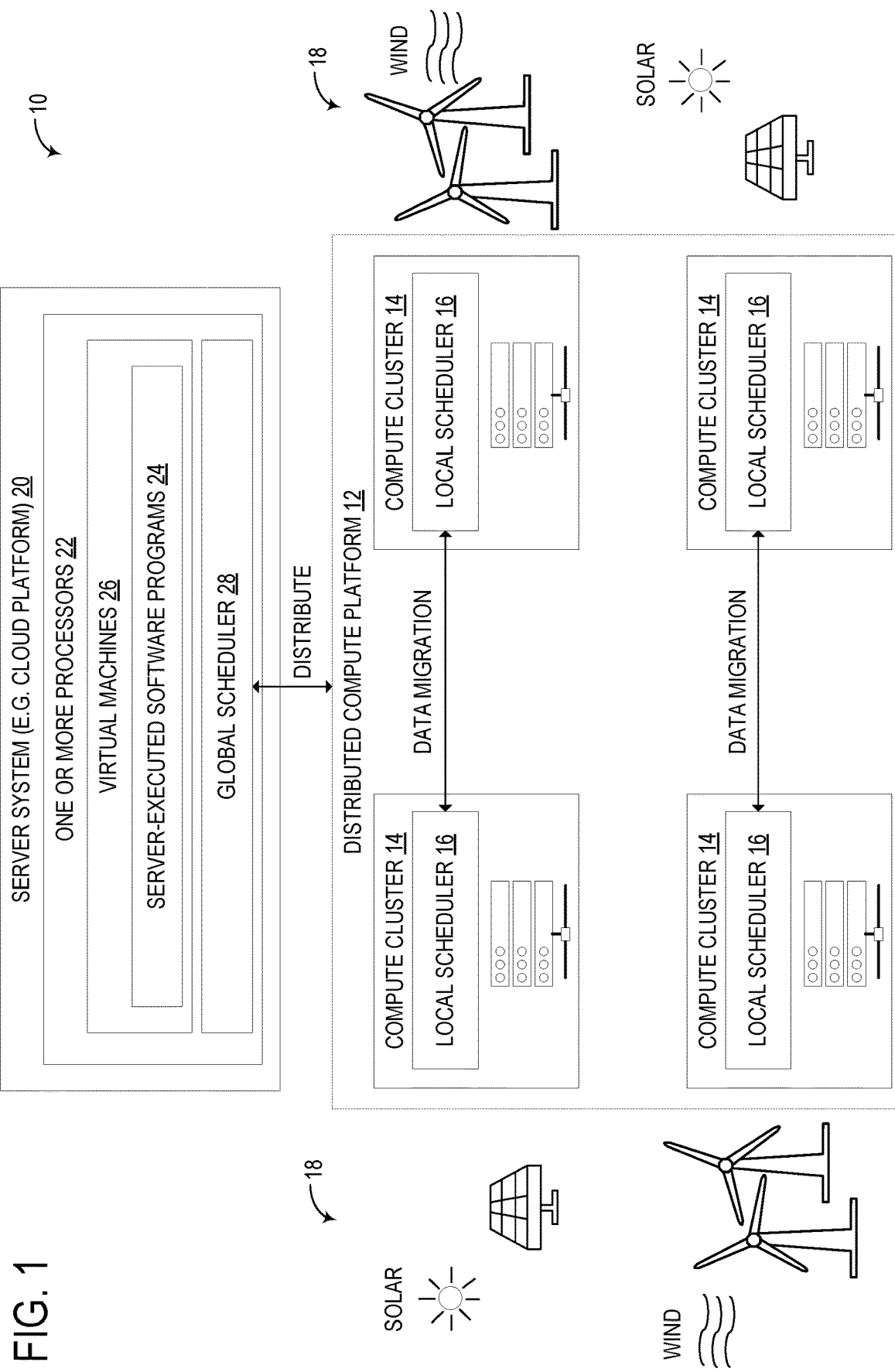
FIG. 1 shows a schematic view of an example computer system that shifts computational demand required for server-executed software programs to meet the availability of power provided by renewable energy sources, according to one embodiment of the subject disclosure.

To address these issues, FIG. 1 shows a computer system that implements an approach that shifts computational demand required for server-executed software programs to meet the availability of power provided by renewable energy sources. By shifting demand, the computer system provides renewable energy production facilities and energy grids with flexible demand resources that may be flexed up or down to meet the current energy production. In this manner, the computer system may provide the potential benefit of emulating certain functionality of an energy storage device, such as the ability to shift energy consumption across geography and time, providing similar benefits to a battery, which enables stored energy to be used in different locations and at different times. The flexible provision of computational demand and power usage may potentially allow the computer system to mask the intermittency of renewables, participate in electricity markets, and run virtual machines opportunistically to decarbonize the energy footprint of the computer system and users of the computer system.

The computer system of FIG. 1 provides the potential benefit of enabling a distributed computing approach to cloud infrastructure deployment that efficiently utilizes multiple renewable energy sources such as wind and solar energy sources. In conventional cloud infrastructure deployments, power is sent from various energy sources through transmission and distribution lines to large data centers as needed to meet current demand. However, as discussed above, power will be lost in transmission, distribution, and battery storage. In contrast, in the cloud architecture example shown in FIG. 1, each renewable energy source is coupled with a compute cluster that sized to match local energy production. Computation at the computer cluster is scaled up and down to opportunistically to make use of locally generated power.

As illustrated in FIG. 1, the computer system 10 includes a distributed compute platform 12 comprising a plurality of compute clusters 14 that are located at different geographical locations. Each compute cluster 14 may take the form of a small data center that includes multiple server blades and server infrastructure, such as server racks, top-of-rack switches, etc. Each compute cluster 14 may also include managing software that coordinates compute resources of the compute cluster 14 including a local scheduler 16, which will be discussed in more detail below. Each compute cluster 14 is powered by a local energy source 18 at a geographical location of that compute cluster 14. That is, the compute clusters 14 are located near an energy production facility such that energy loss due to transmission and distributed is mitigated. In one example, the local energy sources 18 have a pattern of energy supply that is variable over time based on an environmental factor such as those discussed below.

As a few non-limiting examples, the local energy sources may include types of renewable energy sources such as a wind energy source, a solar energy source, a geothermal energy source, and a hydropower energy source (e.g., hydroelectric dam or tidal energy harvesting system). These types of energy sources may have different patterns of energy supply that are variable over time based on environmental factors including weather conditions such as a solar condition, a wind condition, a water condition, and a cloud condition. For example, a solar energy source may vary over the time of day, and may produce a peak energy level during the day and a minimum energy level during the night. Further, solar energy sources may also have reduced output during overcast and cloudy days. Other types of solar conditions that may affect the energy production of a solar energy source include an orientation and altitude of the sun and prevalent temperature. As another example, a wind energy source, such as a wind turbine/mill, may generate a peak energy level when wind levels are high, which may occur both during the day and night. Further, a longer-term trend of wind energy may also vary depending upon the season of the year. Thus, different types of renewable energy sources may have different and non-correlated patterns of energy production that vary upon different environmental factors.

The distributed compute platform 12 may include a multitude of compute clusters 14 that are located in different regions around the world. For example, the distributed compute platform 12 may include a Pacific United States region that includes hundreds of compute clusters 14 at different geographical locations within the region. The distributed compute platform 12 may include multiple regions, such as, for example, a Central United States region, an Eastern United States region, a Western European region, an Eastern European region, an Oceanic region, an India region, etc. Each of these regions may include hundreds of compute clusters 14 located at different geographical locations nearby different local energy sources, such as wind and solar energy production facilities.

One challenge associated with using renewable energy is that when local power generation dips due to local environmental factors, servers that are operating using on the local power generation may need to be powered down or operate at a reduced compute load. As a result, software applications being run on that server may potentially lose assigned compute resources drastically, unexpectedly, and frequently. The approach of FIG. 1 may reduce compute resource variability causes by the changing power production of the renewable energy source by relying on more than one compute cluster 14 to perform the functions of a server-executed software program.

As illustrated in FIG. 1, the computer system 10 further includes a server system 20, which may take the form of multiple server devices operating in a cloud computing configuration. Each server device of the server system 20 may include one or more processors 22 that provide cloud platform services for server-executed software programs 24, which may take the form of cloud applications developed and controlled by a client of the cloud platform. The server-executed software programs 24 are contained and executed within virtual machines 26 that may be run by host processors. The virtual machines 26 may include application data and software that is used to perform the functions of the contained server-executed software program 24.

In a conventional cloud platform, the virtual machines 26 and the contained server-executed software program 24 may be executed by host devices of a large data center of the cloud platform. The host devices are typically co-located within the same data center, and use the same server infrastructure. However, as discussed above, if that data center was powered using renewable energy, the frequent and drastic changes in power generation provided by the renewable energy source may potentially cause all of the virtual machines 26 and server-executed software programs 24 to suddenly lose assigned compute resources of the host devices of the cloud platform. To address this challenge, the computer system of FIG. 1 distributes the virtual machines 26 that contain server-executed software programs 24 to the distributed compute platform 12 to run the virtual machines 26.

As illustrated in FIG. 1, the one or more processors 22 of the server system 20 are configured to execute a global scheduler 28 that distributes virtual machines 26 that perform compute tasks for server-executed software programs 24 to the plurality of compute clusters 14 of the distributed compute platform 12. The global scheduler 28 may handle allocation of compute clusters 14 and distribution of the virtual machines 26 across the distributed compute platform 12 as a whole. In one example, the global scheduler 28 may be configured to identify a set of compute clusters 14 within the distributed compute platform 12 that may collectively provide cloud services for a server-executed software program 24, such that the collection of compute clusters 14 may provide stable compute resources for the server-executed software program 24 even though each individual compute cluster 14 is powered by a renewable energy source that may have variable power generation. The process for selecting an appropriate subset of compute clusters 14 for each server-executed software program 24 will be discussed in more detail below.

After assigning each server-executed software program 24 with a set of compute clusters 24, the server system 20 sends data for the virtual machines 26 for those server-executed software programs 24 to the assigned compute clusters 24 over a computer network. In one example, each of the compute clusters 14 assigned to a server-executed software program 24 may receive a copy of the virtual machine 26 for that server-executed software program 24. Each compute cluster 14 may individually spin up or spin down the local instance of the virtual machine 26 based on a current or future energy level provided by the local energy source 18. The local scheduler 16 executed by each compute cluster 14 may be configured to adjust a compute load on the compute cluster 14 based on the current or future energy level provided by the local energy source 18. Additionally, when the current or future energy level provided by the local energy source 18 drops below a threshold level, such as the energy provided by a solar energy source at night time, then the local scheduler 16 of that compute cluster 14 may be configured to manage migration of data to another compute cluster 14 that was also assigned to that server-executed software program 24, such as a compute cluster that is powered by a wind energy source. The migrated data may, for example, include state data, application data, and other types of data related to execution of the server-executed software program 24.

Figure 2:
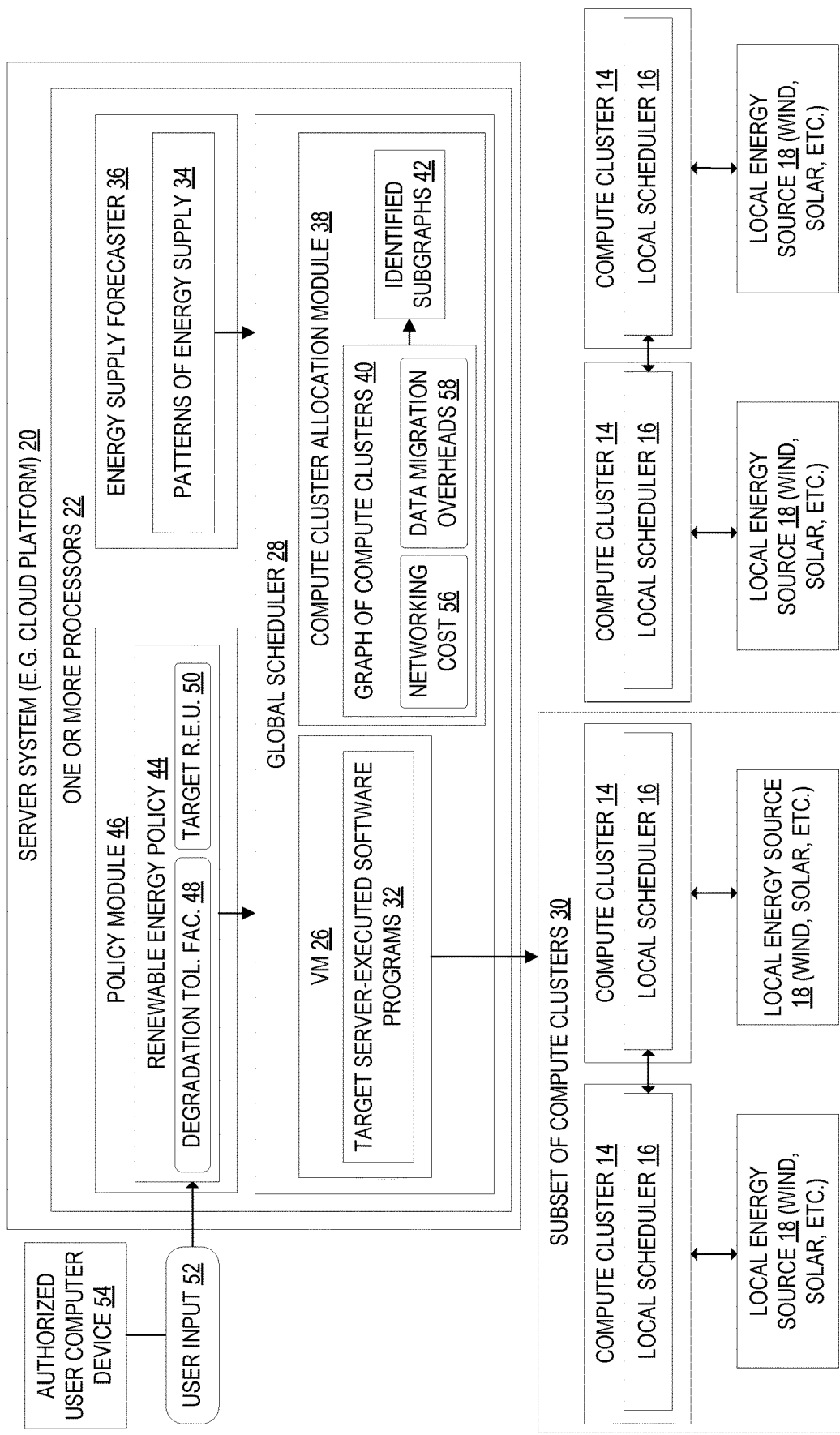
FIG. 2 shows a schematic view of the computer system including a subset of compute nodes that have been selected for a target server-executed software program, implemented by the computer system of FIG. 1.

FIG. 2 illustrates an example process of distributing virtual machines 26 to an assigned subset 30 of the compute clusters 14. In the illustrated example, the one or more processors 22 of the server system 20 may be configured to select the subset 30 of compute clusters 30 for a particular target server-executed software program 32 based on several factors. The global scheduler may then distribute virtual machines 26 that perform compute tasks for that target server-executed software program 32 to one or more compute clusters 14 of the selected subset 30 of compute clusters.

In one example, the global scheduler 28 may be configured to select the subset 30 of compute clusters 14 such that respective compute clusters of the subset 30 of compute clusters 14 are powered by local energy sources 18 that have different complementary patterns of energy supply such that the subset 30 of compute clusters 14 aggregately provide a target compute resource availability for virtual machines 26 for the target server-executed software program 32. The different patterns of energy supply 34 for the local energy sources 18 of the plurality of compute clusters 14 may be estimated by an energy supply forecaster 36 executed by the one or more processors 22 of the server system 20. The energy supply forecaster 36 may be configured to retrieve weather data from external and internal databases, such as, for example, the European Meteorological Derived High Resolution Renewable Energy Source (EMHIRES) database. It should be appreciated that the server system 20 may be configured to retrieve weather and meteorological data from any suitable database that may include past and current weather data.

Figure 3:
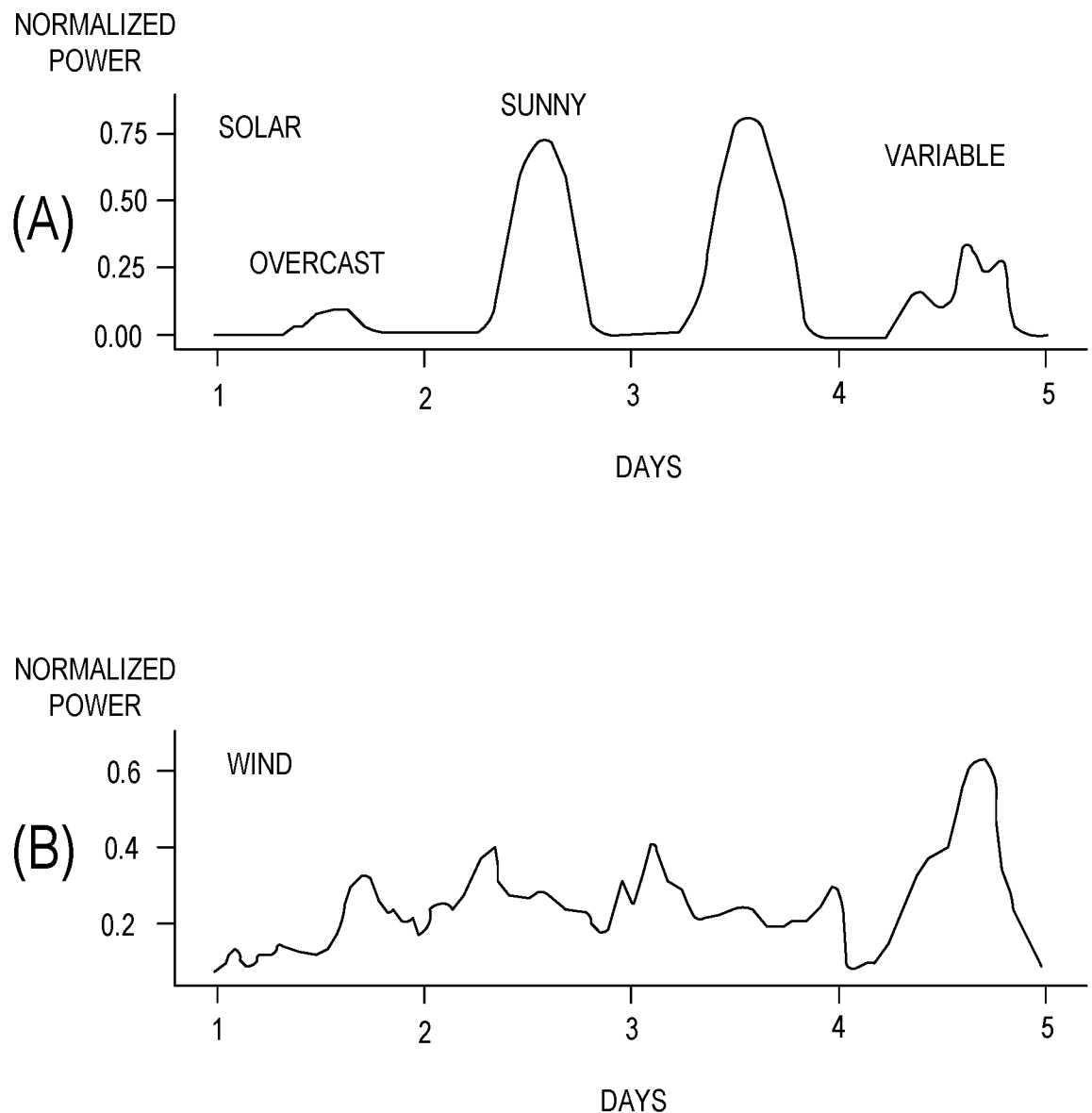
FIG. 3 at (A) shows an illustrative example of solar production, normalized to the max production capacity for local energy sources of the computer system of FIG. 1.

Renewable energy production typically exhibits a large amount of variability across space (different locations), time (times of the day, seasons, etc.), and different resources (solar, wind, etc.). FIG. 3 at (A) shows an illustrative example of solar production, normalized to the max production capacity. As shown, solar energy typically follows a periodic diurnal pattern. However, overcast sky conditions with heavy clouds during the day can significantly reduce the peak production. In the illustrated example, the overcast day has a peak production of 3.5% compared to the peak production of 77% the following day that is sunny without an overcast sky condition. Further, days with variable cloud patterns can cause spiky energy production throughout the day. The changing seasons of the year may similarly cause variability of the peak energy production of a solar energy source. For example, the peak energy production in winter may potentially be ~75% less than the peak energy production in summer.

Additionally, other types of energy sources may exhibit vastly different patterns of energy production. FIG. 3 at (B) shows an illustrative example of wind energy production for the same duration as the solar energy production. In the illustrated example, wind energy sources have sharp peaks and valleys that may frequently changing depending on weather conditions, but rarely go down to zero as compared to the solar energy production. Thus, wind energy sources may potentially continue to produce energy during the night and on overcast days when solar energy production drastically dips. On the other hand, solar energy production may produce high peak energy productions during sunny days in a periodic diurnal pattern that may provide large amounts of power to a compute cluster. In this manner, solar and wind energy source may provide complementary patterns of energy production that produce peak energy levels based on non-correlated factors such that the energy sources aggregately provide energy throughout the day.

The same type of energy source may also exhibit different patterns of energy production when located at different geographical regions. That is, a wind energy production facility at a first location may experience different wind conditions than a wind energy production facility at a second location. Thus, even through both facilities produce energy using wind, the patterns of energy production for those two energy sources will be different depending on the local weather. In this manner, two wind energy sources in two different locations may also provide complementary patterns of energy production.

Figure 4:
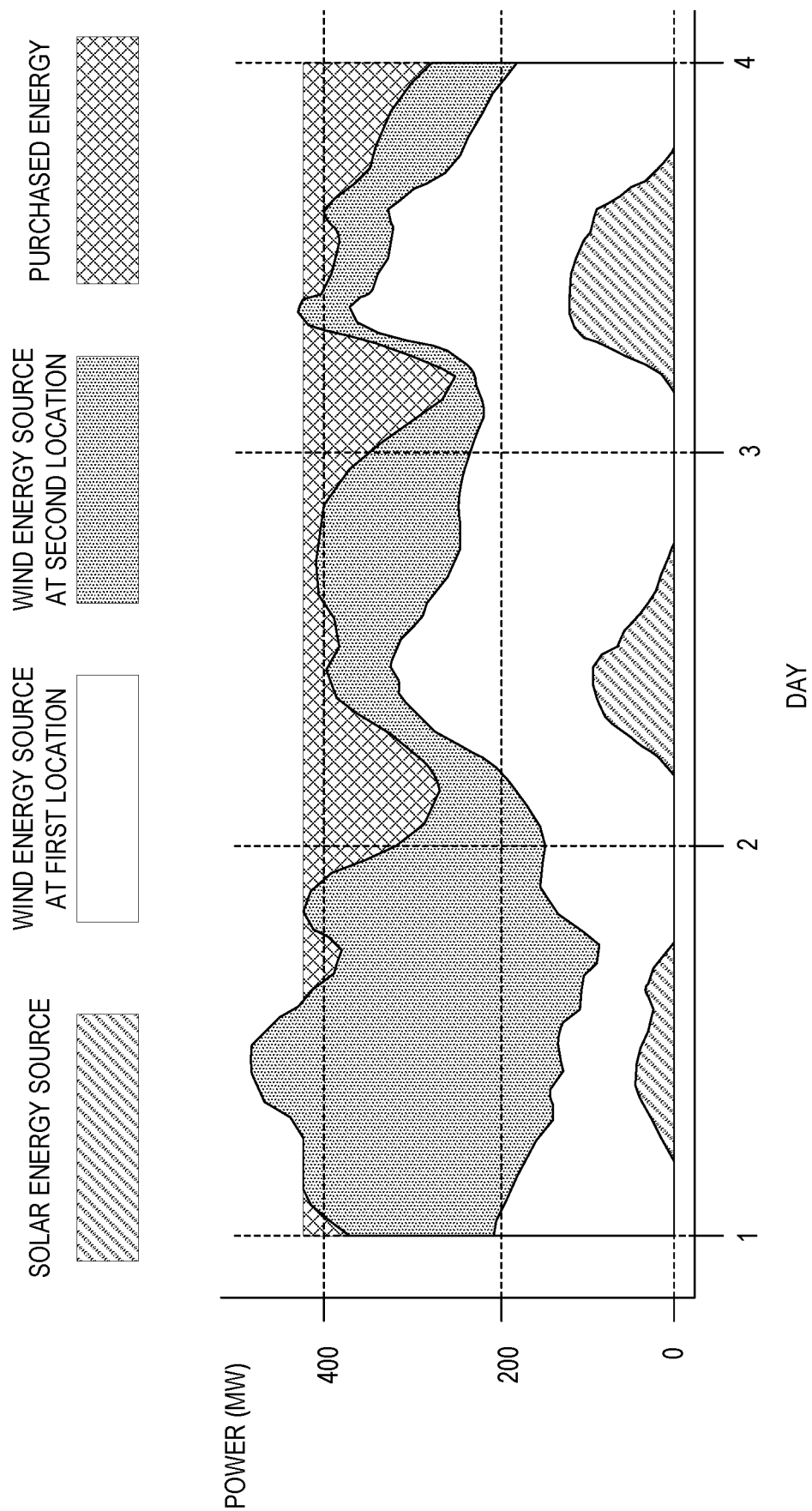
FIG. 4 shows an illustrative example of a stacked area graph showing different patterns of energy production that are complementary for local energy sources of the computer system of FIG. 1

FIG. 4 shows an illustrative example of a stacked area graph where upper areas are added to all areas below them, which illustrates that despite the large variability in patterns of energy production of each individual renewable energy production site, the different patterns of energy production may be identified that be independent and/or complimentary when looking at different geographical locations and/or times of the day. For example, renewable energy production facilities that use different energy sources may be affected by different non-correlated environmental factors. Specifically, a wind energy source may potentially produce energy at night while a solar energy source at the same/similar geographical location may be at a minimum energy production level.

As another example, local micro-climates or weather conditions may be significantly different between separate geographical locations. Thus, the same type of renewable energy production facility may produce different amounts of energy at two different locations. Specifically, a solar energy source at one location may produce high levels of energy due to a sunny environment, while another solar energy source at a second location may produce low level of energy due to an overcast sky. As another example, the local time of day may be different at different geographical locations. For example, at the same point in time it may be daytime at one geographical location and dusk at another geographical location. Thus, a solar energy source at the first location may be generating peak energy while a solar energy source at the second location is generating minimum energy.

The global scheduler 28 may be configured to leverage the different patterns of energy supply 34 of the respective compute clusters 14 by assigning multiple compute clusters 14 with complementary patterns in order to mask the variability in the patterns of energy production of any one compute cluster alone. For example, FIG. 4 shows an example of three energy sources that provide complementary patterns of energy supply. The illustrated example includes normalized power data for different energy sources including a solar energy source, a wind energy source at a first location, a wind energy source at a second location, and purchased energy which may include non-renewable energy sources. Each energy source typically has a similar peak capacity of 400 megawatts (MW), which is the typical median peak-capacity across large energy farm.

In one example, coefficient of variation, (COV) (i.e., standard deviation divided by mean), may be used as a comparison metric to analyze whether a subset of compute clusters will provide an improved stability in aggregate energy supply for performing compute tasks of the sever-executed software program. In the illustrative example of FIG. 4, combining just two energy sources may provide the potential benefit of improving (i.e., reducing or minimizing) COV for many combinations of energy sources. These combinations of energy sources that improve COV for the aggregate energy supply may be recognized by the global scheduler 28 as having complementary patterns of energy supply. In some examples, minor variability in a selected combination of compute clusters having local energy sources with complementary patterns of energy production, can be filled with purchased energy from the local electric grid, which may include new-renewable energy sources. In this manner, renewable energy sources may be prioritized, and non-renewable energy sources may opportunistically be used to smooth over minor variations in energy supply.

Turning back to FIG. 2, the global scheduler 28 may include a compute cluster allocation module 38 that performs analysis on the plurality of compute clusters 30 and the associated local energy sources 18, such as the COV analysis described above, to identify the subset 30 of compute clusters 14 that are powered by local energy sources 18 that have different complementary patterns of energy supply such that the subset 30 of compute clusters 14 aggregately provide a target compute resource availability for virtual machines 26 for the target server-executed software program 32. In one example, to determine the subset 30 of compute clusters 14, the compute cluster allocation module 38 may be configured to perform a graph analysis on a graph of compute clusters 40 that includes data for the plurality of compute clusters 14 as a whole. The compute cluster allocation module 38 may be configured to identify one or more subgraphs 42 of compute clusters 14 that meet the demands and/or requirements of the target server-executed software program 32 to provide suitable cloud-based services. One of the identified subgraphs 42 of compute clusters 14 may then be assigned to the target server-executed software program 32 as the subset 30 of compute clusters. The global scheduler 28 may then distribute VMs 26 for the target server-executed software program 32 to the selected subset 30 of compute clusters 14.

In one example, the compute cluster allocation module 38 may be configured to periodically update the analysis of the graph of compute clusters 40 to identify more optimal subgraphs 42 based on new data. For example, the compute cluster allocation module 38 may continuously or periodically receive new data for the large trends in patterns of energy supply 34 estimated by the energy supply forecaster 36 for the different regions where the compute clusters 14 are located. After receiving updated trend data, the compute cluster allocation module 38 may update the analysis of the graph of compute clusters 40, and reassign subsets 30 of compute clusters 14 to the server-executed software programs 24 if required.

The subset 30 of compute clusters 14 for a target server-executed software program 32 may be selected based on several different metrics. In one example, the subset 30 of compute clusters 14 for the target server-executed software program 32 may be selected based on a software implemented renewable energy policy 44 associated with the target server-executed software program 32. The software implemented renewable energy policy 44 may be managed by a policy module 46 executed by the server system 20 which may include modifiable renewable energy policies 44 associated with each respective server-executed software program 24. Each software implemented renewable energy policy 44 may include the requirements and/or target metrics for renewable energy use for the associated server-executed software program 24. In one example, the software implemented renewable energy policy 44 indicates a software service degradation tolerance factor 48 and a target renewable energy usage 50 for the target server-executed software program 32.

In one example, the one or more processors 22 of the server system 20 may be configured to receive user input 52 from an authorized user associated with the target server-executed software program 32. For example, the policy module 46 may be configured to manage profiles for each server-executed software program 24 including credentials to verify that a user and/or authorized user computer device 54 is authorized for that server-executed software program 24. It should be appreciated that any authorization protocol may be implemented by the server system 20 for verifying user credentials. The policy module 46 may be configured to receive the user input 52 that indicates one or more of the software service degradation tolerance factor 48 and the target renewable energy usage 50 for the target server-executed software program 32. For example, the user input 52 may include user inputted values or user selections for the software service degradation tolerance factor 48 and the target renewable energy usage 50. In one example, the policy module 46 may be configured to present a graphical user interface (GUI) via an application and/or web page that may be accessed by the authorized user computer device 54 that may be used to enter the user input 52. It should be appreciated that the user input 52 may be received via any suitable input modality.

Through the user input 52, the authorized user may customize the renewable energy policy 44 to fit the compute requirements of their server-executed software program 32. The software service degradation tolerance factor 48 may indicate how tolerant the server-executed software program 32 is to compute service interruptions. For example, the software service degradation tolerance factor 48 may indicate a compute resource availability uptime required for the server-executed software program 32 that should be met by the server system 20. For example, a user facing software application that operates in real-time may require a relatively high compute resource availability uptime due to any interruptions in service potentially degrading user experience for that server-executed software program 32. On the other hand, a blockchain-based software program, a big data software program, a machine learning related software program, or another type of software program that does not require immediate and uninterrupted response time may potentially require a relatively lower compute resource availability uptime as many of those computations may be shifted to later points in time without degrading the functionality of the application. Through the policy module 46, the authorized user may specify the degradation tolerance factor 48 this is suitable for the requirements of their server-executed software program 32.

As illustrated in FIG. 2, the authorized user may also set the target renewable energy usage 50 goals for the server-executed software program 32. For example, the entity that uses the server-executed software program 32 may have made a carbon-emission reduction pledge, and may require that their server-executed software program 32 should meet that pledge. By customizing the target renewable energy usage 50 of the renewable energy policy 44, the authorized user may balance a target renewable energy goal with a target performance of the server-executed software program 24. That is, the computer system 10 may be configured to prioritize execution of the virtual machines 26 of that server-executed software program 32 on compute clusters 14 that are powered by renewable energy even if those compute clusters may have potentially variable compute resource availability uptime.

A server-executed software program 24 that is associated with a renewable energy policy 44 with a relatively lower target renewable energy usage 50 may have performance and uptime of the application take a higher priority. Thus, the computer system 10 may allocate compute clusters 30 to the software application that have access to a local electric grid that can provide stable non-renewable energy to fill in dips in energy production of the local renewable energy source. In this manner, a higher level of performance and uptime may be guaranteed for the server-executed software program 32 at the expense of potentially using less renewable energy during runtime of that software program.

The global scheduler 28 may be configured to select the subset of compute clusters 30 for each server-executed software program 24 based on the renewable energy policy 44 and the trends for patterns of energy supply 34 for different regions as discussed above. In one example, the global scheduler 28 may be further configured to select the subset of compute clusters 30 for the target server-executed software program 32 based on a networking cost 56 for sending data between compute clusters 14 of the subset 30 being lower than a threshold networking cost value. The networking cost 56 may be calculated based on a variety of factors. For example, the networking cost 56 may be a function of network latency, bandwidth congestion, etc. That is, the global scheduler may be configured 28 to estimate or receive a networking cost 56 measurement, such as, for example, a latency measurement for sending data packets between compute clusters 30.

The compute cluster allocation module 38 may be configured to analyze the graph of compute clusters 40 based on the estimated networking cost for connections between compute clusters in the graph 40. The compute cluster allocation module 38 may then identify the subgraphs 42 of compute clusters 14 that have networking cost measurements for sending data between the compute clusters within the subgraph that are lower than the threshold networking cost value. In one example, the threshold networking cost value may be a default value for the computer system 10. In another example, the threshold networking value may be specified via user input 52 from an authorized user of the server-executed software program 24.

As discussed above, the global scheduler 28 may select one of the identified subgraphs 42 of compute clusters 14 generated by the compute cluster allocation module 38, and allocate the referenced subset 30 of compute clusters 14 to the target server-executed software program 32. The global scheduler 28 may then be configured to distribute separate instances of the virtual machines 26 for the target server-executed software program 32 to each compute cluster 14 of the subset 30 of compute clusters. That is, full separate instances of the virtual machine 26 that contains the target server-executed software program 32 may be distributed to all or some of the subset 30 of compute clusters 30. The separate instances of the virtual machines 26 are configured to be powered up or powered down based on a local energy supply provided by the local energy source 18 to each compute cluster 14 of the subset 30 of compute clusters. Thus, compute clusters 14 that currently have sufficient energy supply may power up and execute the virtual machine 26 that contains the target server-executed software program 32, while computes clusters 14 that do not have sufficient energy supply may power down or initiate a standby mode for the virtual machine 26. In this manner, execution of the target server-executed software program 32 may be flexed upwards or downwards to meet the variable patterns of energy production of the local energy sources 18 of the subset 30 of compute clusters assigned to that target server-executed software program 32.

In some examples, the target server-executed software programs 32 require state information or other types of data to perform the functions of the program. Thus, in examples where execution of the virtual machine 26 containing the target server-executed software program 32 is moved from a first compute cluster to one or more other compute clusters in the subset 30, that state information or other associated data may need to be migrated over a computer network from the first compute cluster to the one or more other compute clusters. Migrating to multiple other compute clusters may provide potential benefits for redundancy when there is an important workload that needs to be executed, and/or there is spare capacity available to run the migrated virtual machines in the target other compute clusters. In other examples, the global scheduler 28 may be configured to distribute the virtual machines 26 of the target server-executed software program 32 to a portion of the subset 30 assigned to that target server-executed software program. When execution of the virtual machine 26 is moved to a compute cluster 14 in the subset 30 that does not currently have a stored instance of the virtual machine 26, data for the entire virtual machine 26 may need to be migrated to that compute cluster over a computer network. In these examples, the data migration may be handled by the local schedulers 16 of each compute cluster 14.

As the target server-executed software programs 32 and/or the required data used by those software programs may be large, the data migration between compute clusters 14 may also be large. Further, due to the often frequent and drastic changes in energy production of the local renewable energy sources 18, data migration between compute clusters may potentially cause bursty network overheads on the computer networks connecting the compute clusters 14. Further, these computer networks may potentially be more constrained than typical computer networks given the remote locations of typical renewable energy production facilities.

In one example, to mitigate the network overhead incurred by data migration between compute clusters 14, the global scheduler 28 may be further configured to estimate the potential network overhead based on the predicted trends of patterns of energy supply 34 for the relevant compute clusters. Typically, the predicted trends of patterns of energy supply 34 may provide accurate estimates hours ahead of time, and may further provide predictions up to days and weeks in advance. Thus, significant migration points between compute clusters 14 can be predicted with typically at least a day of notice. That is, the global scheduler 28 may determine points in the future with sharp drops/increases in power, and allocate the compute clusters 14 to the server-executed software programs 32 to reduce or mitigate the potential network bottleneck.

In one example, to select the subset 30 of compute clusters 14 from the plurality of compute clusters for the target server-executed software program 32, the global scheduler 28 is further configured to estimate a trend or pattern of energy supply 34 that will be provided to each compute cluster 14 of the plurality of compute clusters, estimate a data migration overhead 58 for different subsets 30 of compute clusters 14 based on the estimated trend of energy supply 34 for compute clusters 14 of each different subset of compute clusters, and select the subset 30 of compute clusters 14 for the target server-executed software program 32 that has an estimated data migration overhead 58 that is below a threshold value.

Figure 5:
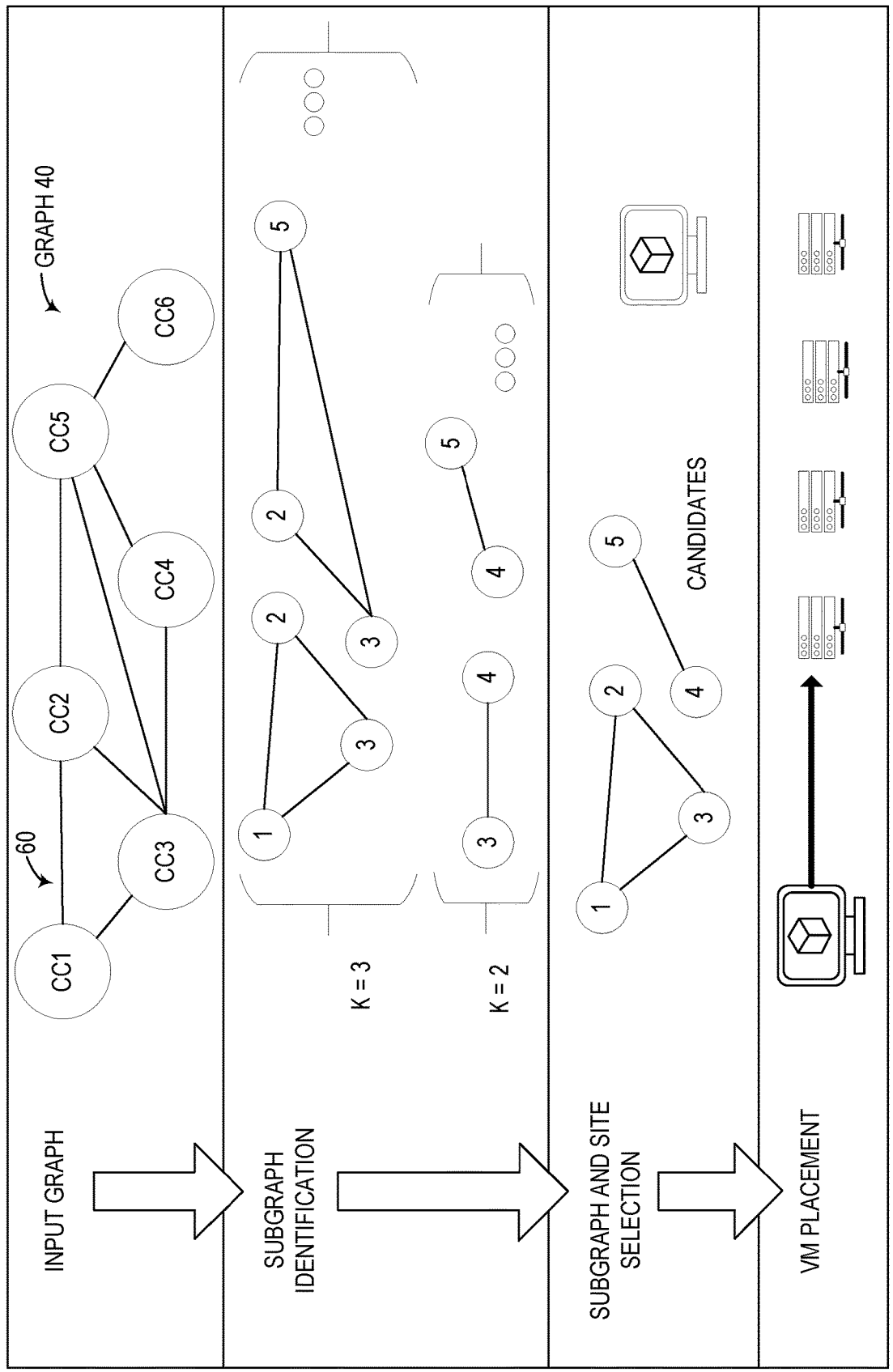
FIG. 5 shows an example subgraph selection process used to select the subset of compute clusters assigned to server-executed software programs, implemented by the computer system of FIG. 1.

FIG. 5 illustrates an example subset 30 of compute clusters 14 selection process performed by the global scheduler 18. In the illustrated example, the global scheduler 18 is configured to model the compute clusters 14 as a graph 40 of compute clusters 14. Each node in the illustrated example represents a compute cluster and may include a predicted pattern of energy supply 34 and a total and/or allocated computation capacity for that compute cluster. Two nodes in the graph 40 are connected via an edge 60 if the networking cost 56 for sending data between those two nodes is less than a threshold networking cost value, which may be a default value such as 50 milliseconds or a customizable value received from the authorized user. The compute cluster allocation module 38 may then process the graph 40 of compute clusters in four steps: 1) subgraph identification, 2) subgraph selection, 3) site selection, and 4) server selection & VM placement. This process may be performed for each server-executed software program 24 in an initialization step, and as the environmental factors such as weather changes. As weather predictions update, trends of patterns of energy supply update, and as executed of software programs complete and compute resources free up, the global scheduler 28 may be configured to perform the process shown in FIG. 5, and reassign subsets 30 of compute clusters 14 to the server-executed software programs 24.

During the subgraph identification step, the compute cluster allocation module 38 may be configured to identify subgraphs 42 from the larger graph 40 which have a measured networking cost 56 below a threshold networking cost value and complementary patterns of energy supply such that the subset of compute clusters aggregately provides a target compute resource availability for virtual machines for the target server-executed software program. In one example, the optimization and identification step may be formatted as a k-clique identification and prioritization problem. First, the compute cluster allocation module 38 may be configured to find all cliques (fully connected graphs) of a given size k (e.g. k=2 to 5). These represent subgraphs with a below threshold networking cost value between any two compute clusters 14. Thus, a server-executed software program 24 that is split/distributed across such a subgraph would not experience high networking cost overheads. Next, for each k, the compute cluster allocation module 38 may be configured to sort all subgraphs 42 based on a total coefficient of variability (COV) in the subgraph 42.

Next, during subgraph 42 and site selection, the compute cluster allocation module 38 may be configured to select the subset 30 of compute clusters 14 that will be allocated to the target server-executed software program 32. During subgraph identification, the compute cluster allocation module 38 may generate large number of identified subgraphs 42. Thus, during subgraph selection, the compute cluster allocation module 38 may be configured to select a smaller set of subgraph candidates, and further configured to, for each candidate subgraph, determine a compute cluster 14 placement schedule. For both the steps, subgraphs are selected to optimize for two things: (1) choosing subsets of compute clusters 14 that are predicted to maintain suitable power levels to mitigate or reduce migration overhead, and (2) balancing compute load between the compute clusters 14 in the subset 30.

In order to effectively mitigate or reduce data migration overhead, the compute cluster allocation module 38 may be configured to distribute virtual machines 26 for the target server-executed software program 32 on compute clusters 14 that are expected to have stable energy supply in the future based on the predictions for the patterns of energy supply 34 determined by the energy supply forecaster 36. Additionally, the compute cluster allocation module 38 may be configured to maintain a mix of virtual machines for server-executed software programs 32 that have a relatively higher degradation tolerance factor 48 that matches a predicted pattern of energy supply for that compute cluster 14. Thus, when power reduces, the virtual machines for the server-executed software programs 24 that have higher degradation tolerance factors 48 may be deprioritized for the available compute resources of the compute cluster 14 such that the virtual machines 26 for server-executed software programs 32 that have a low degradation tolerance factor 48 may receive suitable compute resources and thus will not need to be migrated to another compute cluster 14. Further, virtual machines 26 of server-executed software programs 32 may be preemptively migrated when the predicted pattern of energy supply 34 indicates that energy supply for that compute cluster 14 will dip below a threshold value, thus spreading out data migrations over time and reducing burstiness. The data migration may be handled by the global scheduler 28 and/or local scheduler 16 of the compute cluster 14 separately or in concert.

After the subset 30 of compute clusters 14 has been selected, the global scheduler 28 may be configured to distribute the virtual machines 26 onto compute clusters 14 in the assigned subset 30 of compute clusters 14 to minimize total power usage.

Figure 6:
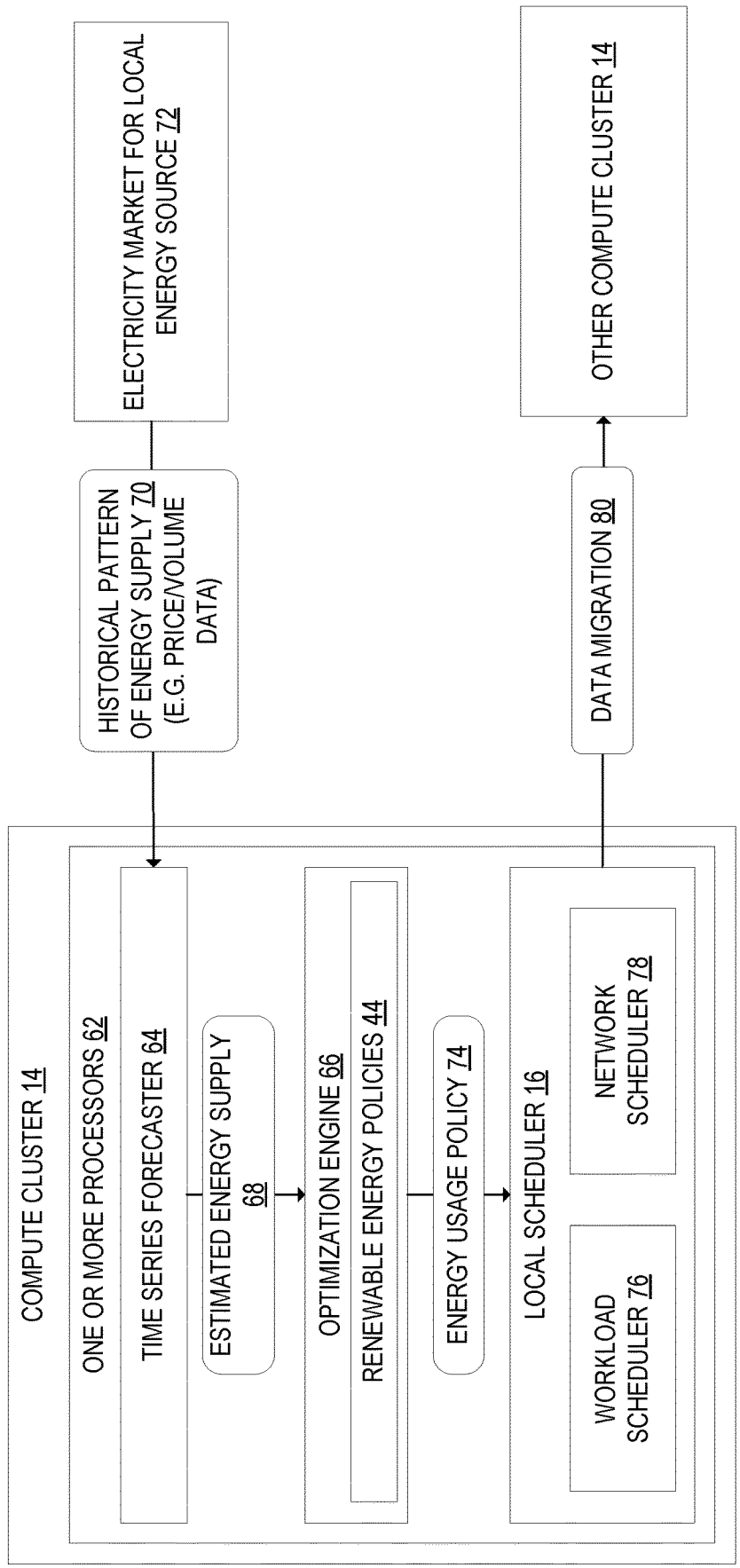
FIG. 6 shows a schematic view of a compute cluster that implements a time series forecaster, an optimization engine, and a local scheduler to perform local load balancing and data migration, implemented by the computer system of FIG. 1.

FIG. 6 illustrates an example compute cluster 14 that may be allocated to execute server-executed software programs 24. As illustrated, the compute cluster 14 may include one or more processors 62 that may be configured to execute a time series forecaster 64, an optimization engine 66, and the local scheduler 16. The time series forecaster 64 may be configured estimate an energy supply 68 that will be provided to that compute cluster 14 by the local energy source 18 in the future based on a historical pattern of energy 70 that have been provided by the local energy source 18. In a specific example, the compute cluster 14 may analyze data received from a local electricity market 72 for the local energy source 18 such as historical prices, volume data, added context (time of year, day of the year, weather patterns, etc.), to forecast future prices and estimate an energy supply that may be provided to the compute cluster 14 in the future.

As illustrated in FIG. 6, the estimated energy supply 68 may be provided to the optimization engine 66. The optimization engine 66 may be configured to generate an energy usage policy 74 for the compute cluster 14 increasing or decreasing compute resources provided by the compute cluster 14 to the server-executed software programs 24 being run by that compute cluster 14. The energy usage policy 74 may be generate at least in part based on the renewable energy policies 44 of each server-executed software program being run by the compute cluster 14. For example, server-executed software programs with a higher degradation tolerance factor 48 may be assigned less compute resources while server-executed software programs with a lower degradation tolerance factor 48 may be assigned relatively higher compute resource of the compute cluster 14 when an energy level supplied by the local energy source dips.

The energy usage policy 74 may include a power schedule to run different workloads for the server-executed software programs at different periods in each time horizon. As illustrated in FIG. 6, the energy usage policy 74 may be received by the local scheduler 16. The local scheduler 16 may be configured to increase or decreases a compute resource availability provided to virtual machines 26 by that compute cluster 14 based on an estimation of an energy supply 68 that will be provided to that compute cluster 14 by the local energy source 18 in the future. In one example, the local scheduler 16 may overclock or underclock the one or more processors 62 of the compute cluster to flex up or flex down the compute resource availability of the computer cluster 14. In another example, the local scheduler 16 may ration the available compute resources of the compute cluster 14 given the estimated energy supply 68 to the server-executed software programs based on their associated renewable energy policies 44. In another example, decreasing the compute resource availability provided to the virtual machines 26 may include evicting a virtual machine 26 such that no compute resources are provided to that virtual machine.

In one example, the local scheduler 16 may further include a workload scheduler 76 that maps different virtual machines 26 to different mechanisms for modulating energy usage and compute resource availability of the compute cluster 14. These mechanisms may, for example, include shutting down or booting up virtual machines, power capping the one or more processors 62, reducing compute resources provided to server-executed software programs with a higher degradation tolerance factor, and migrating virtual machines 26 or data associated with a virtual machine 26 to another compute cluster 14 within the subset 30 of compute clusters.

The local scheduler 16 may further include a network scheduler 78 that is configured to manage data migration 80 to the other compute clusters 14. In one example, the network scheduler 78 of a first compute cluster of the subset 30 may be configured to determine that the energy supply 68 that will be provided to that compute cluster 14 by the local energy source 18 in the future is below a threshold energy supply level, and migrate data for the target server-executed software program 32 to one or more other compute clusters of the subset 30 of compute clusters 14. In one example, the network scheduler 78 may be configured to determine a schedule for data migration that may occur in the future due to the estimated trends in energy supply, and may be configured to spread out the data migration 80 over time in order to mitigate the network overhead.

Using these techniques, each compute cluster 14 may be configured to opportunistically increase or decrease compute resources and power usage to meet the current and future energy supply available from the local energy source 18, and migrate virtual machines 26 and/or data associated with the virtual machines to other compute clusters 14 in the subset 30 when required in a decentralized manner.

Figure 7:
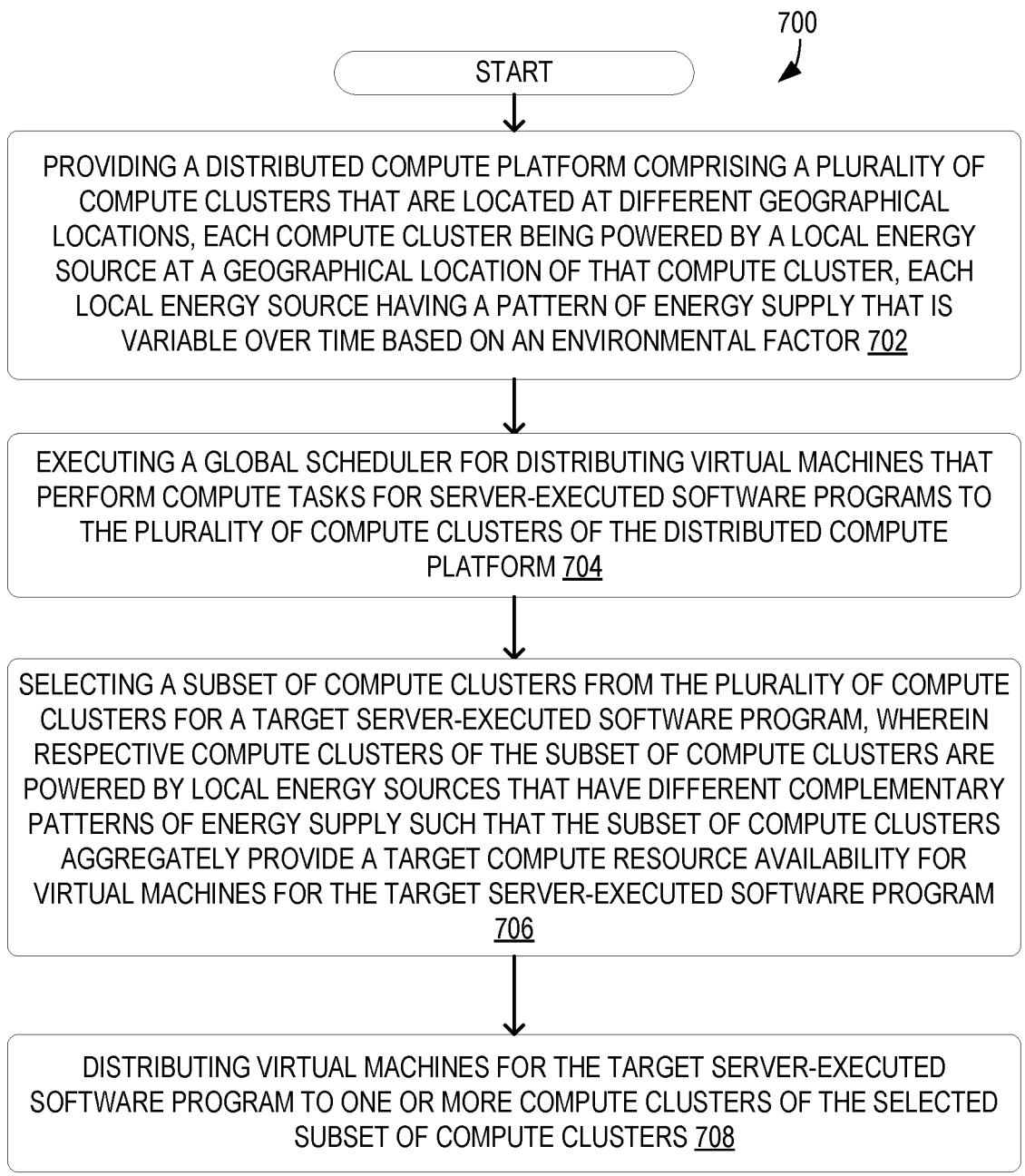
FIG. 7 shows a flowchart for an example computer implemented method for shifting computational demand required for server-executed software programs to meet the availability of power provided by renewable energy sources, according to one embodiment of the subject disclosure.

FIG. 7 shows a flowchart for an example method 700 for shifting computational demand required for server-executed software programs to meet the availability of power provided by renewable energy sources.

At 702, the method 700 may include providing a distributed compute platform comprising a plurality of compute clusters that are located at different geographical locations. Each compute cluster is powered by a local energy source at a geographical location of that compute cluster. Each local energy source has a pattern of energy supply that is variable over time based on an environmental factor.

At 704, the method 700 may include executing a global scheduler for distributing virtual machines that perform compute tasks for server-executed software programs to the plurality of compute clusters of the distributed compute platform.

At 706, the method 700 may include selecting a subset of compute clusters from the plurality of compute clusters for a target server-executed software program. Respective compute clusters of the subset of compute clusters are powered by local energy sources that have different complementary patterns of energy supply such that the subset of compute clusters aggregately provide a target compute resource availability for virtual machines for the target server-executed software program.

In one example, the subset of compute clusters for the target server-executed software program is further selected based on a software implemented renewable energy policy associated with the target server-executed software program. The software implemented renewable energy policy indicates a software service degradation tolerance factor and a target renewable energy usage for the target server-executed software program. In this example, step 706 may further include receiving user input from an authorized user associated with the target server-executed software program, the user input indicating one or more of the software service degradation tolerance factor and the target renewable energy usage for the target server-executed software program.

In another example, the subset of compute clusters for the target server-executed software program is further selected based on a networking cost for sending data between compute clusters of the subset being lower than a threshold networking cost value.

In another example, step 706 may further include estimating a trend of energy supply that will be provided to each compute cluster of the plurality of compute clusters, estimating a data migration overhead for different subsets of compute clusters based on the estimated trend of energy supply for compute clusters of each different subset of compute clusters, and selecting the subset of compute clusters for the target server-executed software program that has an estimated data migration overhead that is below a threshold value.

At 708, the method 700 may include distributing virtual machines for the target server-executed software program to one or more compute clusters of the selected subset of compute clusters.

Figure 8:
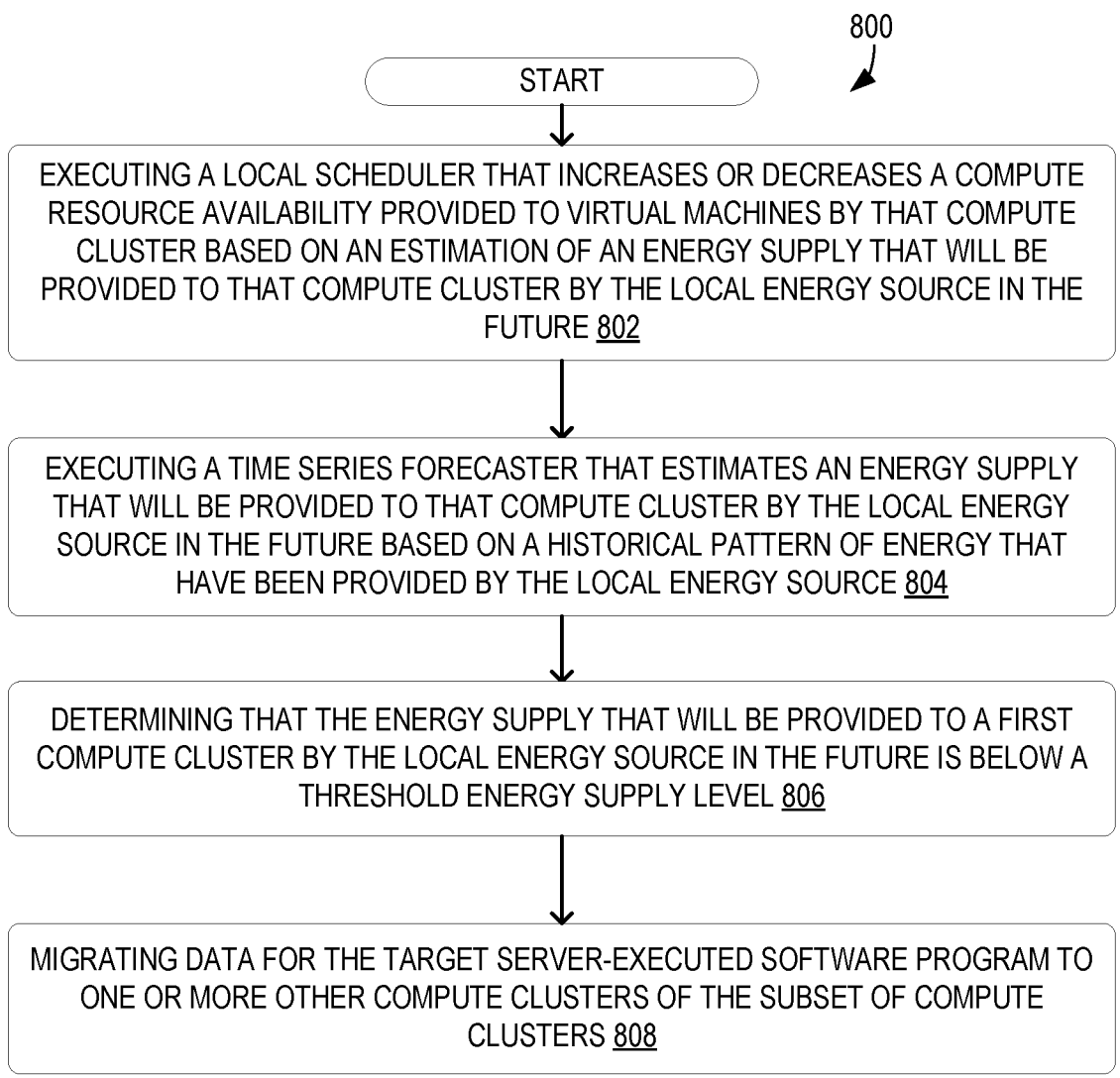
FIG. 8 shows a flowchart for an example computer implanted method for performing local load balancing and data migration at each compute cluster in a distributed compute platform, according to one embodiment of the subject disclosure.

FIG. 8 shows a flowchart for an example method 800 for performing compute load balancing and data migration between compute clusters. The method 800 may be performed by each compute cluster of a plurality of compute clusters of a distributed compute platform.

At 802, the method 800 may include, at each compute cluster, executing a local scheduler that increases or decreases a compute resource availability provided to virtual machines by that compute cluster based on an estimation of an energy supply that will be provided to that compute cluster by the local energy source in the future.

At 804, the method 800 may include, at each compute cluster, executing a time series forecaster that estimates an energy supply that will be provided to that compute cluster by the local energy source in the future based on a historical pattern of energy that have been provided by the local energy source.

At 806, the method 800 may include at a first compute cluster, determining that the energy supply that will be provided to the first compute cluster by the local energy source in the future is below a threshold energy supply level.

At 808, the method 800 may include migrating data for the target server-executed software program to one or more other compute clusters of the subset of compute clusters.

The techniques and methods described herein shift computational demand required for server-executed software programs to meet the availability of power provided by renewable energy sources. The compute shifting process provides the potential benefit of enabling a distributed computing approach to cloud infrastructure deployment that efficiently utilizes multiple renewable energy sources such as wind and solar energy sources. Using the distributed compute platform described herein, each renewable energy source is coupled with a compute cluster that sized to match local energy production, and computation at the computer cluster is scaled up and down to opportunistically to make use of locally generated power. The techniques and methods provide the potential benefit of efficiently utilizing renewable energy resources such as solar and wind energy that typically has had a small market penetration into the cloud-computing market due to the variable patterns of energy production of those types of renewable energy.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
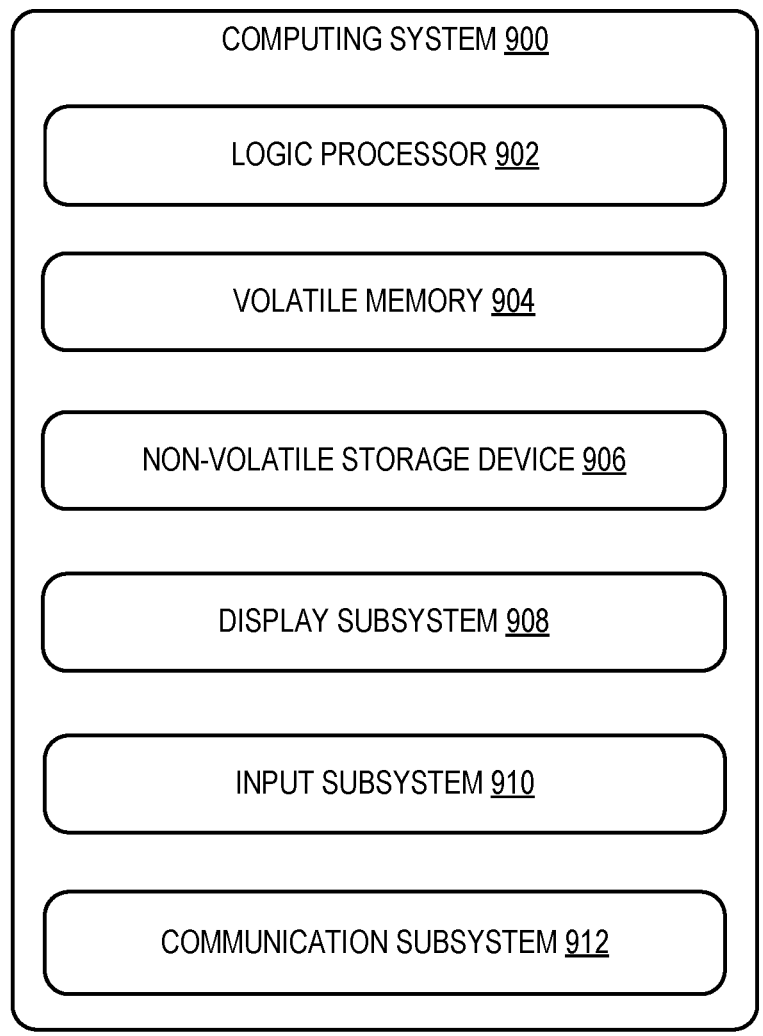
FIG. 9 shows a schematic view of an example computing environment in which the computer system of FIG. 1 may be enacted.

FIG. 9 schematically shows a non-limiting embodiment of a computing system 900 that can enact one or more of the methods and processes described above. Computing system 900 is shown in simplified form. Computing system 900 may embody the computer devices of the computer system 10 described above and illustrated in FIGS. 1 and 2. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computer system comprising a distributed compute platform comprising a plurality of compute clusters that are located at different geographical locations. Each compute cluster is powered by a local energy source at a geographical location of that compute cluster. Each local energy source has a pattern of energy supply that is variable over time based on an environmental factor. The computer system further comprises a server system comprising at least one processor configured to execute a global scheduler that distributes virtual machines that perform compute tasks for server-executed software programs to the plurality of compute clusters of the distributed compute platform. To distribute virtual machines for a target server-executed software program, the global scheduler is configured to select a subset of compute clusters from the plurality of compute clusters for the target server-executed software program. Respective compute clusters of the subset of compute clusters are powered by local energy sources that have different complementary patterns of energy supply such that the subset of compute clusters aggregately provide a target compute resource availability for virtual machines for the target server-executed software program. The global scheduler is further configured to distribute virtual machines for the target server-executed software program to one or more compute clusters of the selected subset of compute clusters.

In this aspect, additionally or alternatively, the local energy sources may include a type of renewable energy source selected from the group consisting of a wind energy source, a solar energy source, a geothermal energy source, and a hydropower energy source. In this aspect, additionally or alternatively, the environmental factor may include a weather condition selected from the group consisting of a solar condition, a wind condition, a water condition, and a cloud condition.

In this aspect, additionally or alternatively, the subset of compute clusters for the target server-executed software program may be further selected based on a software implemented renewable energy policy associated with the target server-executed software program. The software implemented renewable energy policy may indicate a software service degradation tolerance factor and a target renewable energy usage for the target server-executed software program. In this aspect, additionally or alternatively, the one or more processors of the server system may be further configured to receive user input from an authorized user associated with the target server-executed software program The user input may indicate one or more of the software service degradation tolerance factor and the target renewable energy usage for the target server-executed software program.

In this aspect, additionally or alternatively, the subset of compute clusters for the target server-executed software program may be further selected based on a networking cost for sending data between compute clusters of the subset being lower than a threshold networking cost value. In this aspect, additionally or alternatively, to distribute virtual machines for the target server-executed software program, the global scheduler may be further configured to distribute separate instances of the virtual machines for the target server-executed software program to each compute cluster of the subset of compute clusters. The separate instances of the virtual machines may be configured to be powered up or powered down based on a local energy supply provided to each compute cluster of the subset of compute clusters.

In this aspect, additionally or alternatively, each compute cluster of the subset of compute clusters is configured to execute a local scheduler that increases or decreases a compute resource availability provided to virtual machines by that compute cluster based on an estimation of an energy supply that will be provided to that compute cluster by the local energy source in the future. In this aspect, additionally or alternatively, each compute cluster of the subset of compute clusters may be further configured to execute a time series forecaster that estimates an energy supply that will be provided to that compute cluster by the local energy source in the future based on a historical pattern of energy that have been provided by the local energy source.

In this aspect, additionally or alternatively, the local scheduler executed by a first compute cluster of the subset of compute clusters may be further configured to determine that the energy supply that will be provided to that compute cluster by the local energy source in the future is below a threshold energy supply level, and migrate data for the target server-executed software program to one or more other compute clusters of the subset of compute clusters. In this aspect, additionally or alternatively, to select the subset of compute clusters from the plurality of compute clusters for the target server-executed software program, the global scheduler may be further configured to estimate a trend of energy supply that will be provided to each compute cluster of the plurality of compute clusters, estimate a data migration overhead for different subsets of compute clusters based on the estimated trend of energy supply for compute clusters of each different subset of compute clusters, and select the subset of compute clusters for the target server-executed software program that has an estimated data migration overhead that is below a threshold value.

Another aspect provides a method comprising providing a distributed compute platform comprising a plurality of compute clusters that are located at different geographical locations. Each compute cluster is powered by a local energy source at a geographical location of that compute cluster. Each local energy source has a pattern of energy supply that is variable over time based on an environmental factor. The method further comprises executing a global scheduler for distributing virtual machines that perform compute tasks for server-executed software programs to the plurality of compute clusters of the distributed compute platform. The method further comprises selecting a subset of compute clusters from the plurality of compute clusters for a target server-executed software program. Respective compute clusters of the subset of compute clusters are powered by local energy sources that have different complementary patterns of energy supply such that the subset of compute clusters aggregately provide a target compute resource availability for virtual machines for the target server-executed software program. The method further comprises distributing virtual machines for the target server-executed software program to one or more compute clusters of the selected subset of compute clusters.

In this aspect, additionally or alternatively, the subset of compute clusters for the target server-executed software program may be further selected based on a software implemented renewable energy policy associated with the target server-executed software program. The software implemented renewable energy policy may indicate a software service degradation tolerance factor and a target renewable energy usage for the target server-executed software program. In this aspect, additionally or alternatively, the method may further comprise receiving user input from an authorized user associated with the target server-executed software program. The user input may indicate one or more of the software service degradation tolerance factor and the target renewable energy usage for the target server-executed software program.

In this aspect, additionally or alternatively, the subset of compute clusters for the target server-executed software program may be further selected based on a networking cost for sending data between compute clusters of the subset being lower than a threshold networking cost value. In this aspect, additionally or alternatively, the method may further comprise, at each compute cluster, executing a local scheduler that increases or decreases a compute resource availability provided to virtual machines by that compute cluster based on an estimation of an energy supply that will be provided to that compute cluster by the local energy source in the future. In this aspect, additionally or alternatively, the method may further comprise, at each compute cluster, executing a time series forecaster that estimates an energy supply that will be provided to that compute cluster by the local energy source in the future based on a historical pattern of energy that have been provided by the local energy source.

In this aspect, additionally or alternatively, the method may further comprise, at a first compute cluster, determining that the energy supply that will be provided to the first compute cluster by the local energy source in the future is below a threshold energy supply level, and migrating data for the target server-executed software program to one or more other clusters of the subset of compute clusters. In this aspect, additionally or alternatively, selecting the subset of compute clusters from the plurality of compute clusters for the target server-executed software program may further comprise estimating a trend of energy supply that will be provided to each compute cluster of the plurality of compute clusters, estimating a data migration overhead for different subsets of compute clusters based on the estimated trend of energy supply for compute clusters of each different subset of compute clusters, and selecting the subset of compute clusters for the target server-executed software program that has an estimated data migration overhead that is below a threshold value.

Another aspect provides a compute cluster comprising one or more server devices powered by a local energy source having a pattern of energy supply that is variable over time based on an environmental factor. The one or more server devices are configured to execute virtual machines that perform compute tasks for server-executed software programs. At least one processor of the compute cluster is configured to execute a time series forecaster that estimates an energy supply that will be provided to that compute cluster by the local energy source in the future based on a historical pattern of energy that have been provided by the local energy source, and execute a local scheduler that increases or decreases a compute resource availability provided to virtual machines by the one or more server devices of the compute cluster based on an estimation of an energy supply that will be provided to that compute cluster by the local energy source in the future.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
a distributed compute platform comprising a plurality of compute clusters that are located at different geographical locations, each compute cluster being powered by a local energy source at a geographical location of that compute cluster, each local energy source having a pattern of energy supply that is variable over time based on an environmental factor; and
a server system comprising at least one processor configured to execute a global scheduler that distributes virtual machines that perform compute tasks for server-executed software programs to the plurality of compute clusters of the distributed compute platform,
wherein to distribute virtual machines for a target server-executed software program, the global scheduler is configured to:
select a subset of compute clusters from the plurality of compute clusters for the target server-executed software program, wherein respective compute clusters of the subset of compute clusters are powered by local energy sources that have different complementary patterns of energy supply, wherein the subset of compute clusters for the target server-executed software program is further selected based on a software implemented renewable energy policy associated with the target server-executed software program, the software implemented renewable energy policy indicating a software service degradation tolerance factor and a target renewable energy usage for the target server-executed software program; and
distribute virtual machines for the target server-executed software program to one or more compute clusters of the selected subset of compute clusters, wherein distributing the virtual machines includes migrating one or more of the virtual machines to one or more other compute clusters of the subset of compute clusters based at least in part on the software service degradation tolerance factor and the target renewable energy usage.

2. The computer system of claim 1, wherein the local energy sources include a type of renewable energy source selected from the group consisting of a wind energy source, a solar energy source, a geothermal energy source, and a hydropower energy source.

3. The computer system of claim 2, wherein the environmental factor includes a weather condition selected from the group consisting of a solar condition, a wind condition, a water condition, and a cloud condition.

4. The computer system of claim 1, wherein the one or more processors of the server system are further configured to receive user input from an authorized user associated with the target server-executed software program, the user input indicating one or more of the software service degradation tolerance factor and the target renewable energy usage for the target server-executed software program.

5. The computer system of claim 1, wherein the subset of compute clusters for the target server-executed software program is further selected based on a networking cost for sending data between compute clusters of the subset being lower than a threshold networking cost value.

6. The computer system of claim 1, wherein to distribute virtual machines for the target server-executed software program, the global scheduler is further configured to distribute separate instances of the virtual machines for the target server-executed software program to each compute cluster of the subset of compute clusters, wherein the separate instances of the virtual machines are configured to be powered up or powered down based on a local energy supply provided to each compute cluster of the subset of compute clusters.

7. The computer system of claim 1, wherein each compute cluster of the subset of compute clusters is configured to execute a local scheduler that increases or decreases a compute resource availability provided to virtual machines by that compute cluster based on an estimation of an energy supply that will be provided to that compute cluster by the local energy source in the future.

8. The computer system of claim 7, wherein each compute cluster of the subset of compute clusters is further configured to execute a time series forecaster that estimates an energy supply that will be provided to that compute cluster by the local energy source in the future based on a historical pattern of energy that have been provided by the local energy source.

9. The computer system of claim 8, wherein the local scheduler executed by a first compute cluster of the subset of compute clusters is further configured to:
determine that the energy supply that will be provided to that compute cluster by the local energy source in the future is below a threshold energy supply level; and
migrate data for the target server-executed software program to one or more other compute clusters of the subset of compute clusters.

10. The computer system of claim 9, wherein to select the subset of compute clusters from the plurality of compute clusters for the target server-executed software program, the global scheduler is further configured to:
estimate a trend of energy supply that will be provided to each compute cluster of the plurality of compute clusters;
estimate a data migration overhead for different subsets of compute clusters based on the estimated trend of energy supply for compute clusters of each different subset of compute clusters; and
select the subset of compute clusters for the target server-executed software program that has an estimated data migration overhead that is below a threshold value.

11. The computer system of claim 1, wherein the global scheduler is configured to receive the software service degradation tolerance factor and the target renewable energy usage associated with the target server-executed software program via user input to a graphical user interface (GUI).

12. A method comprising:
providing a distributed compute platform comprising a plurality of compute clusters that are located at different geographical locations, each compute cluster being powered by a local energy source at a geographical location of that compute cluster, each local energy source having a pattern of energy supply that is variable over time based on an environmental factor;
executing a global scheduler for distributing virtual machines that perform compute tasks for server-executed software programs to the plurality of compute clusters of the distributed compute platform;
selecting a subset of compute clusters from the plurality of compute clusters for a target server-executed software program, wherein respective compute clusters of the subset of compute clusters are powered by local energy sources that have different complementary patterns of energy supply, wherein the subset of compute clusters for the target server-executed software program is further selected based on a software implemented renewable energy policy associated with the target server-executed software program, the software implemented renewable energy policy indicating a software service degradation tolerance factor and a target renewable energy usage for the target server-executed software program; and
distributing virtual machines for the target server-executed software program to one or more compute clusters of the selected subset of compute clusters, wherein distributing the virtual machines includes migrating one or more of the virtual machines to one or more other compute clusters of the subset of compute clusters based at least in part on the software service degradation tolerance factor and the target renewable energy usage.

13. The method of claim 12, further comprising receiving user input from an authorized user associated with the target server-executed software program, the user input indicating one or more of the software service degradation tolerance factor and the target renewable energy usage for the target server-executed software program.

14. The method of claim 12, wherein the subset of compute clusters for the target server-executed software program is further selected based on a networking cost for sending data between compute clusters of the subset being lower than a threshold networking cost value.

15. The method of claim 12, further comprising, at each compute cluster, executing a local scheduler that increases or decreases a compute resource availability provided to virtual machines by that compute cluster based on an estimation of an energy supply that will be provided to that compute cluster by the local energy source in the future.

16. The method of claim 15, further comprising, at each compute cluster, executing a time series forecaster that estimates an energy supply that will be provided to that compute cluster by the local energy source in the future based on a historical pattern of energy that have been provided by the local energy source.

17. The method of claim 16, further comprising, at a first compute cluster:
determining that the energy supply that will be provided to the first compute cluster by the local energy source in the future is below a threshold energy supply level; and
migrating data for the target server-executed software program to one or more other clusters of the subset of compute clusters.

18. The method of claim 12, wherein selecting the subset of compute clusters from the plurality of compute clusters for the target server-executed software program further comprises:
estimating a trend of energy supply that will be provided to each compute cluster of the plurality of compute clusters;
estimating a data migration overhead for different subsets of compute clusters based on the estimated trend of energy supply for compute clusters of each different subset of compute clusters; and
selecting the subset of compute clusters for the target server-executed software program that has an estimated data migration overhead that is below a threshold value.

19. The method of claim 12, further comprising receiving the software service degradation tolerance factor and the target renewable energy usage associated with the target server-executed software program via user input to a graphical user interface (GUI).

20. A compute cluster comprising:
one or more server devices powered by a local energy source having a pattern of energy supply that is variable over time based on an environmental factor, the one or more server devices being configured to execute virtual machines that perform compute tasks for server-executed software programs, wherein
at least one processor of the compute cluster is configured to:
execute a time series forecaster that estimates an energy supply that will be provided to that compute cluster by the local energy source in the future based on a historical pattern of energy that have been provided by the local energy source; and
execute a local scheduler that increases or decreases a compute resource availability provided to virtual machines by the one or more server devices of the compute cluster based on an estimation of an energy supply that will be provided to that compute cluster by the local energy source in the future, wherein:
increasing or decreasing the compute resource availability includes migrating one or more of the virtual machines to one or more other compute clusters; and
the one or more virtual machines are migrated based at least in part on respective software service degradation tolerance factors and target renewable energy usages of the server-executed software programs.

* * * * *